(12) United States Patent
Shama et al.

(10) Patent No.: US 9,489,288 B1
(45) Date of Patent: Nov. 8, 2016

(54) SYSTEM, METHOD, AND COMPUTER PROGRAM FOR AUTOMATING ACTIVITIES ASSOCIATED WITH A TESTING PROJECT

(71) Applicant: Amdocs Software Systems Limited, Dublin (IE)

(72) Inventors: Gilli Shama, Raanana (IL); Ravit Shapira, Tel-Aviv (IL); Anatoli Kliner, Alpharetta, GA (US); Sagar Subhash Surana, Alpharetta, GA (US); Meni Kadosh, Ashkelon (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 0 days.

(21) Appl. No.: 14/547,082

(22) Filed: Nov. 18, 2014

(51) Int. Cl.
*G06F 9/44* (2006.01)
*G06F 11/36* (2006.01)

(52) U.S. Cl.
CPC .................................. *G06F 11/3684* (2013.01)

(58) Field of Classification Search
CPC .................................................. G06F 11/3684
USPC ................................................. 717/124–135
See application file for complete search history.

(56) References Cited

U.S. PATENT DOCUMENTS

| | | | |
|---|---|---|---|
| 6,907,546 B1 | 6/2005 | Haswell et al. | |
| 7,334,220 B2 | 2/2008 | Chang et al. | |
| 7,752,607 B2 | 7/2010 | Larab et al. | |
| 7,793,154 B2 | 9/2010 | Chagoly et al. | |
| 8,056,057 B2 | 11/2011 | Larab et al. | |
| 8,296,736 B2 | 10/2012 | Jones et al. | |
| 8,423,964 B2* | 4/2013 | Holden et al. | 717/125 |
| 8,473,913 B2* | 6/2013 | Noller et al. | 717/124 |
| 2007/0089091 A1 | 4/2007 | Larab et al. | |
| 2009/0192836 A1* | 7/2009 | Kelly | 705/7 |

OTHER PUBLICATIONS

Mathias Olausson et al., "Pro Team Foundation Service", May 2013, Apress, pp. xxvii, 1-7, 9-19, 21-41, 43-99, 101-113, 115-199, 201-243, 245-269, 271-291, 293-311, 313-337, 339-365.*

* cited by examiner

*Primary Examiner* — Ted T Vo
(74) *Attorney, Agent, or Firm* — Zilka-Kotab, PC

(57) ABSTRACT

A system, method, and computer program product are provided for automating activities associated with a testing project. In use, design of a testing project is initiated. Additionally, one or more activities associated with the testing project in which to automate are identified based on criteria associated with the one or more activities. Further, the identified one or more activities are automated such that the one or more activities are performed automatically during performance of the testing project.

3 Claims, 7 Drawing Sheets

200

Automated Activities

Product Name: --All--   Product version: --All--
Account: --All--        Test Type: --All--
Release: --All--        Date: --All-- From: --All-- To: --All--

Activities:
☐ BSS
☐ OSS
☐ CHQ-B
☐ CHQ-p
☐ COP
☒ Place order in call center
☒ Place order in self-service

| Activity | Test Sets | | | | | Activity Library |
|---|---|---|---|---|---|---|
| | 0001 | 0002 | 0003 | 0004 | 0005 | Automated Activities |
| Create Customer | X | X | | | | Product Name: --All-- |
| Search Customer | | | A | A | A | Product version: --All-- |
| Place order in call center | a | | a | | a | Account: --All-- |
| Place order in self-service | | X | | A | | Test Type: --All-- |
| Define Payment | X | X | X | X | | Release: --All-- |
| Activate Order | X | | X | X | X | Date: From: --All-- |
| | | | | | | To: --All-- |
| | | | | | | Activities: |
| | | | | | | ☐ BSS |
| | | | | | | ☐ OSS |
| | | | | | | ☐ CHQ-B |
| | | | | | | ☐ CHQ-p |
| | | | | | | ☐ COP |
| | | | | | | ☒ Place order in call center |
| | | | | | | ☐ Place order in self-service |

FIGURE 4

SYSTEM, METHOD, AND COMPUTER PROGRAM FOR AUTOMATING ACTIVITIES ASSOCIATED WITH A TESTING PROJECT

FIELD OF THE INVENTION

The present invention relates to testing projects, and more particularly to automating activities associated with testing projects.

BACKGROUND

Software testing may include manual testing, where a tester runs a test case step by step, or automatic testing, where an automatic script runs the test case. The automatic script may be per activity, which is a test case with variables.

An automation script requires some development effort. In return, testers save the effort of performing manual activities. The return of automation investment increases with the need to test the same activity several times, and for activities that are easier to automate and to run automatically. A selection of activities to automate is part of the automation design phase.

Currently, there is not an efficient way to identify activities in which to automate. There is thus a need for addressing these and/or other issues associated with the prior art.

SUMMARY

A system, method, and computer program product are provided for automating activities associated with a testing project. In use, design of a testing project is initiated. Additionally, one or more activities associated with the testing project in which to automate are identified based on criteria associated with the one or more activities. Further, the identified one or more activities are automated such that the one or more activities are performed automatically during performance of the testing project.

BRIEF DESCRIPTION OF THE DRAWINGS

FIG. 2 illustrates a user interface showing an activity library with an automation repository, in accordance with one embodiment.

FIG. 3 illustrates a user interface for test set design, in accordance with one embodiment.

FIG. 4 illustrates a user interface for marking which activities to automate in a test design, in accordance with one embodiment.

DETAILED DESCRIPTION

Figure 1:
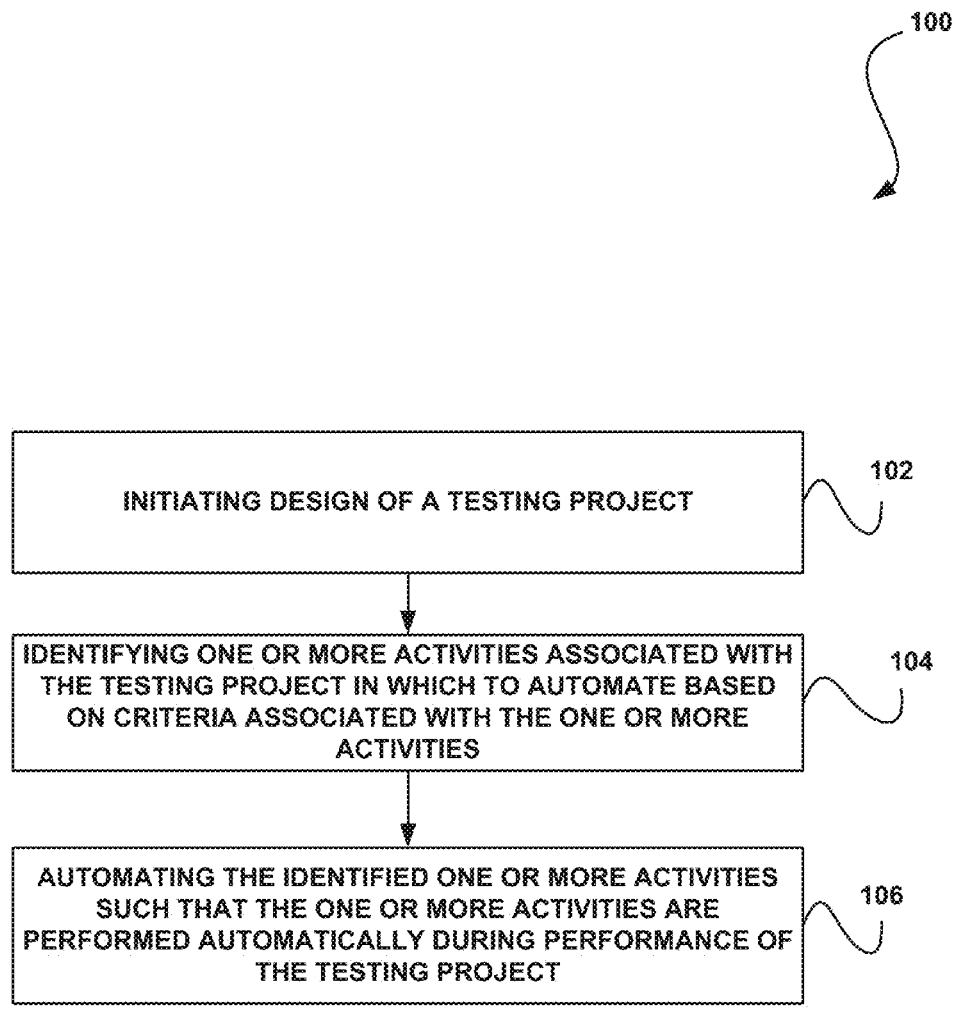
FIG. 1 illustrates a method for automating activities associated with a testing project, in accordance with one embodiment.

FIG. 1 illustrates a method 100 for automating activities associated with a testing project, in accordance with one embodiment.

In operation, design of a testing project is initiated. See operation 102. The testing project may be associated with any software testing, which may include portions of a larger software testing project or an entire software testing project.

Additionally, one or more activities associated with the testing project in which to automate are identified based on criteria associated with the one or more activities. See operation 104.

Further, the identified one or more activities are automated such that the one or more activities are performed automatically during performance of the testing project. See operation 106. Automating the identified activities may function to create a test set associated with the testing project including a plurality of automated activities and a plurality of manual activities.

The activities may include any tasks, processes, and/or steps that are to be performed as part of the software testing project. In some cases, the activities may include activities that are sub portions of larger activities. For example, the activities may include sub-processes within a process. In these cases, automating the identified activities may include automating the sub portions of the larger activities.

Additionally, the activities associated with the testing project in which to automate may include at least one activity that was previously performed manually. For example, an activity that was previously performed manually may be automated based on various criteria. The criteria in which automation selection is based may include a variety of criteria.

For example, in one embodiment, the criteria associated with the activities may include a risk prediction. In this case, the risk prediction may be associated with a risk of an error occurring if the activity was to be performed manually. The risk factors may include various factors, such as a difficulty of the activity, a number of steps associated with the activity, a number of times the activity is to occur, and/or various other factors.

In another embodiment, the criteria associated with the activities may include a number of times the activities are to be performed as part of the testing project. For example, if the activity is to be performed many times as part of the testing project, the activity may be identified as an activity to automate.

As another example, the criteria associated with the activities may include an indication that the activities are associated with an automated activity that exists. For example, a particular activity may already be automated (e.g. from a previous project, etc.). In this case, an automated activity repository may include various preexisting automated activities.

As another example, the criteria associated with the activities may include a location of the activities in the testing project. In other words, the placement of an activity relative to other activities in the testing project may be a consideration when determining which activities to automate.

Of course, any combination of this criteria may be utilized to determine which activities to automate. For example, in one embodiment, the criteria associated with the activities may includes a risk prediction, a number of times the activities is to be performed, an indication that the activities are associated with an automated activity that exists, and a location of the activities in the testing project.

Further, in one embodiment, the method 100 may include recommending automating the identified activities to a user utilizing a user interface (e.g. in a list format, etc.). In this case, activities associated with an automated activity that already exists may be indicated in the user interface (e.g.

indicated utilizing an icon, text, etc.). The automated activities that already exist may be stored in a repository including automated activities.

For example, automating the identified activities may include generating an automation block for each of the identified activities. The automation block may include a script that automates a corresponding activity. Each automation block may be stored in a repository linked to an activity library. In one embodiment, each automation block may be stored with an indication of an automated product name and version, account, testing type, release number, and date. In one embodiment, the user interface may be capable of displaying contents of the activity library.

Accordingly, the method 100 may be utilized to implement an optimization algorithm and tool for automation design. Such automation test design tool may enable a user to design test sets that combine both manual and automated test cases. The activities, generic test cases, may be marked if automation already exists.

Further, the method 100 may be utilized to implement a targeted scope selection engine that is a data decision driven algorithm that, given a project's test design, provides an optimized scope recommendation of which activities to automate, based on risk prediction, activity re-runs, adjacency to other activities to be run, and reuse of an existing automation repository.

An automation platform may also be employed that will enable a user to execute test sets that combine manual and automated test cases, and to generate reports of automation effectiveness. The method 100 may be implemented to increase reusability across projects, reduce the automation development lifecycle, and increase automation and coverage.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The techniques described herein may be utilized to implement an automation design platform that includes a tool for test scope selection, including a repository of available automated activities, allowing of which activities to automate. A targeted scope selection engine may be utilized to recommend an optimized scope, which may be displayed in a design tool (e.g. a user interface).

Test design is typically performed in calendars, where a test calendar is a group of related test sets. The design of test set is based on selection of a series of activities (i.e. test cases with variable parameters) from an activity library, and marking which activities to automate.

The activity library is a list of activities that are common across projects. The library may be for different testing phases, different releases on the same account, or for similar projects on different accounts with the same applications, etc. The activities include information such as execution steps and input parameters with possible values.

An automation block is a script that automates a test activity. All automation blocks may be saved in a repository linked to the activity library with an indication of the automated product name and version, account, testing type, release, and date. A user may view the automated activities and may filter for specific automation characteristics.

FIG. 2 illustrates a user interface 200 showing an activity library with an automation repository, in accordance with one embodiment. As an option, the user interface 200 may be implemented in the context of the details of FIG. 1. Of course, however, the user interface 200 may be implemented in the context of any desired environment. Further, the aforementioned definitions may equally apply to the description below.

As shown, the activity library may show all available automation blocks saved in the repository, along with an indication of the automated product name and version, account, testing type, release, and date. A user may view the automated activities and may search for specific automation characteristics.

In one embodiment, the search results may be presented in a tree format that lists all the building blocks' names with links to all appearances across projects to enable comparison in case customization for the same building block was performed across projects.

An automation building block is a generic function that has mandatory and optional parameters. The automation framework will enable a user to add new functions to the automation repository, add function's parameters, and configure their type (e.g. mandatory or optional) as shown in FIG. 3.

Figure 3:
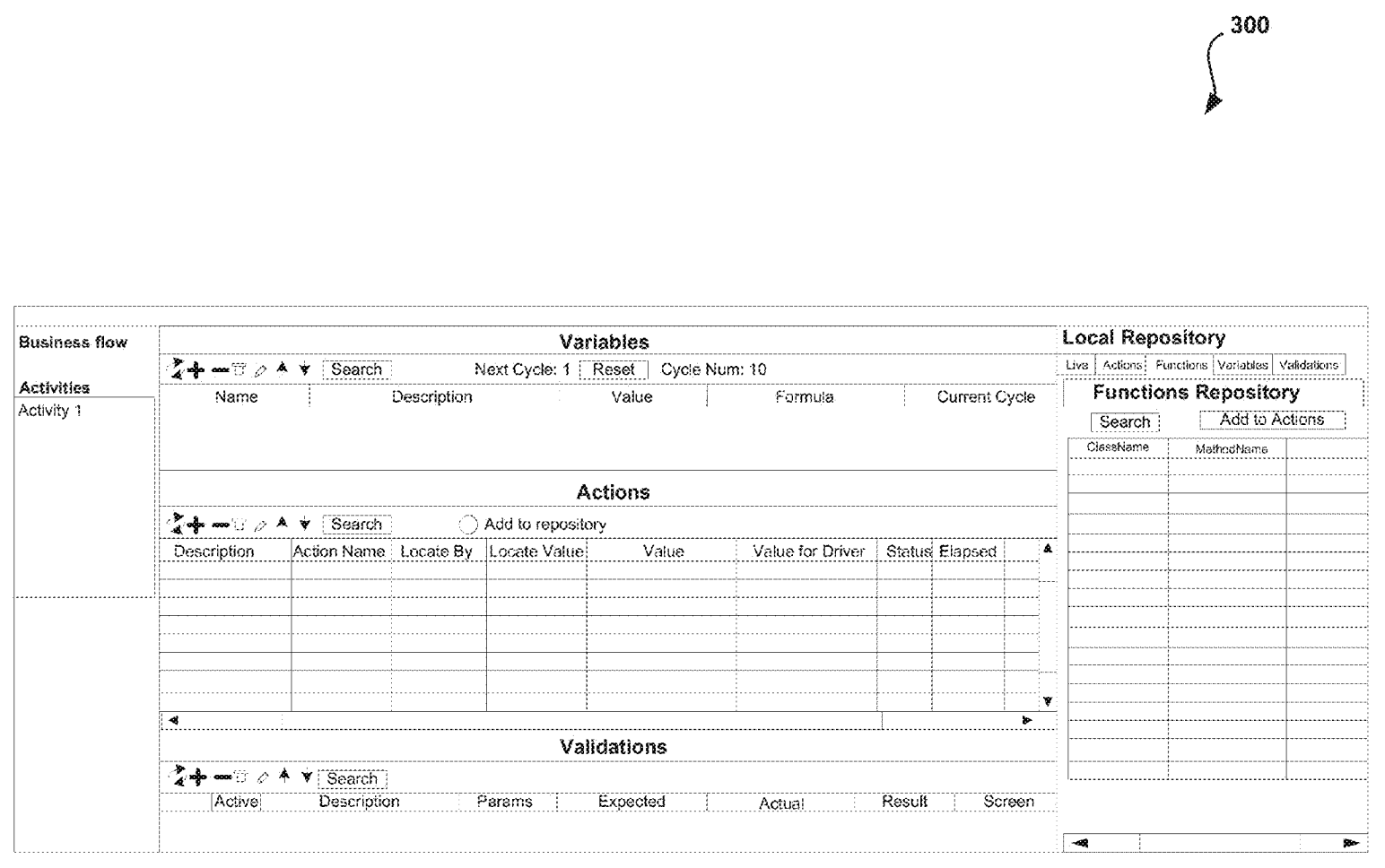

FIG. 3 illustrates a user interface 300 for test set design, in accordance with one embodiment. As an option, the user interface 300 may be implemented in the context of the details of the previous Figures. Of course, however, the user interface 300 may be implemented in the context of any desired environment. Further, the aforementioned definitions may equally apply to the description below.

The test design tool (i.e. the user interface 300) enables testers (without automation capabilities) to create test sets. In reference to the activity library, the test design tool marks which activities are in the automation repository. The tool enables the tester to indicate whether an activity is to be automated. If an activity is automated, it will be available as an automated activity to all planned test sets.

The flows created by manual testers may combine automated and non-automated activities, per needs of the user/test. The tool enables testers to see in one view which test cases are planned as automated, which test cases are ready for running automated, and which test cases are manual. This enables a tester to run the test sets in an efficient manner when their automation is ready.

FIG. 4 illustrates a user interface 400 for marking which activities to automate on the test design, in accordance with one embodiment. As an option, the user interface 400 may be implemented in the context of the details of the previous Figures. Of course, however, the user interface 400 may be implemented in the context of any desired environment. Further, the aforementioned definitions may equally apply to the description below.

In one embodiment, a targeted scope selection engine may recommend an optimized scope. In this case, the optimized scope may be displayed by clicking a button on the user interface 400.

Figure 5:
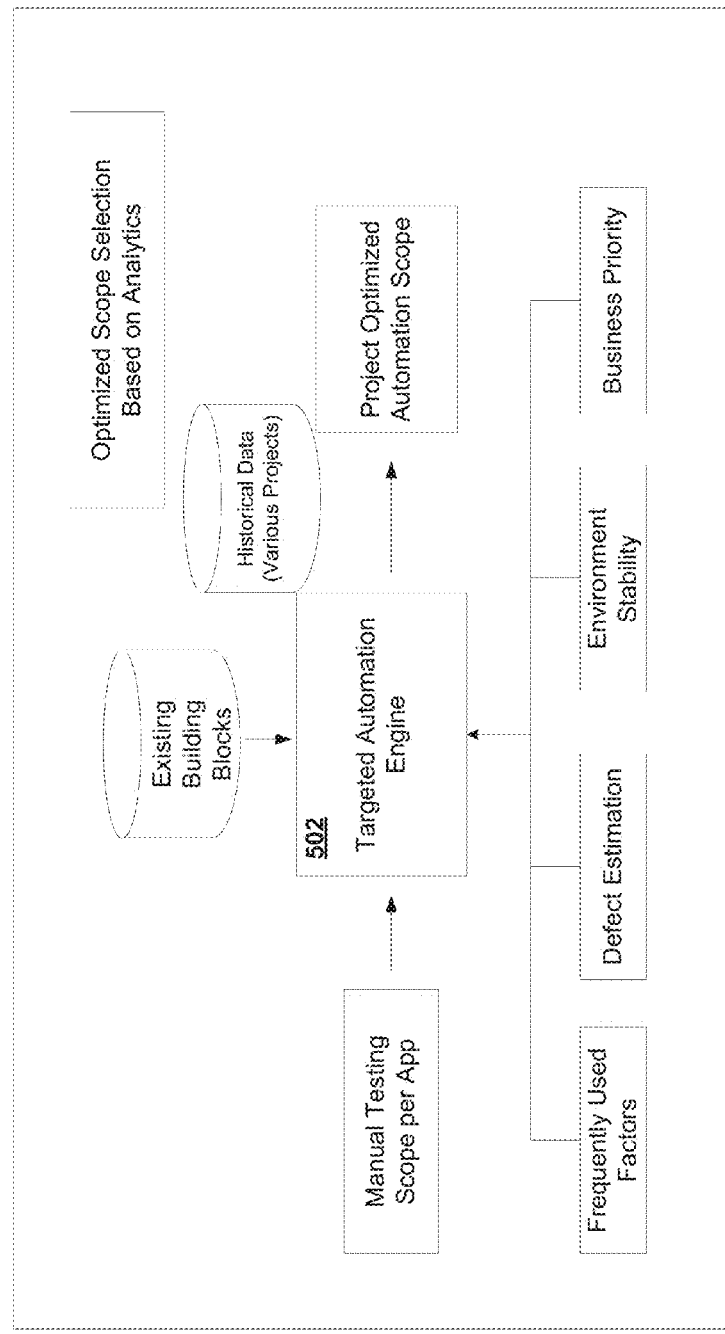
FIG. 5 illustrates a system including a target scope selection engine, in accordance with one embodiment.

FIG. 5 illustrates a system 500 including a target scope selection engine, in accordance with one embodiment. As an option, the system 500 may be implemented in the context of the details of the previous Figures. Of course, however, the system 500 may be implemented in the context of any desired environment. Further, the aforementioned definitions may equally apply to the description below.

The targeted scope selection engine 502 may be based on analytics of historical data in a data warehouse gathered from various testing projects as and when the project version goes into production. The targeted scope selection engine 502 may be fed by different factors such as usage frequency, the stability of the environment, business priority, and defect probability factors, etc.

In one embodiment, the targeted scope selection engine 502 may receive as an input data for all factors including data for existing building blocks (e.g. which indicate reduced automation development effort) and return as an output the optimized scope.

The system 500 may be utilized to identify a testing scope based on optimization analytics of various factors, automating them, and providing them to manual testers in an easy way to build their flow. Furthermore, in one embodiment, the system 500 may be utilized to implement various user interfaces with building blocks that are activities which can be dragged and dropped to a test set from a list of activities that includes both manual and automatic activities. This allows the flexibility to create a flow that is a combination of both manual and automatic activities.

Figure 6:
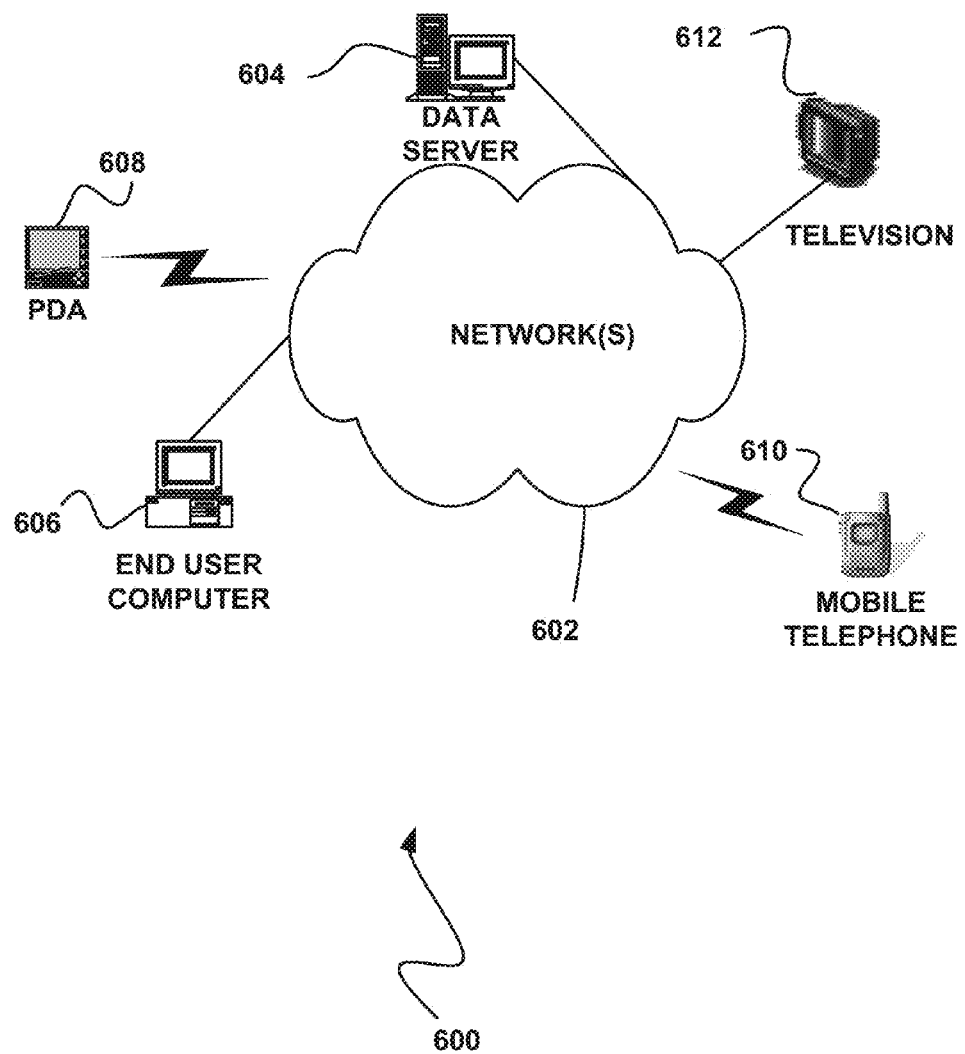
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
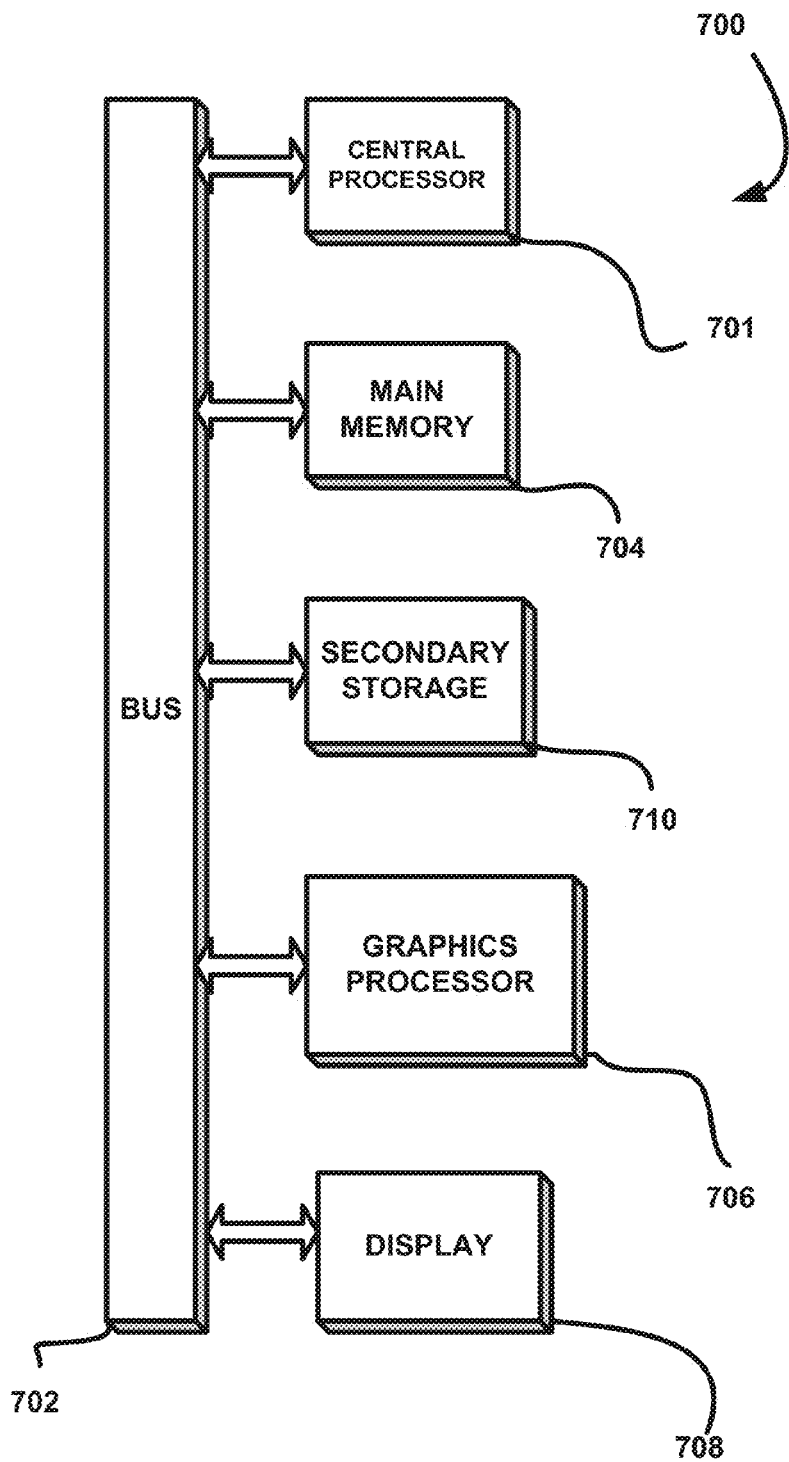
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying in a design of a testing project, by a system, a plurality of manual activities, the plurality of manual activities including a plurality of tasks that are intended by a test project designer as to be performed manually;
automatically determining, by the system, which of the plurality of manual activities to automate, including for each of the manual activities:
  determining, by the system from historical data, a risk of an error occurring if the manual activity is performed manually without being automated,
  determining, by the system, a number of times the manual activity occurs within the testing project,
  determining, by the system, a location of the manual activity within the testing project with respect to a plurality of additional activities,
  inputting to an algorithm by the system the determined risk, the determined number of times, and the determined location within the testing project, and
  receiving as output from the algorithm by the system an indication of whether to automate the manual activity; and
using a repository of available automated activities, converting, by the system, the manual activities that are determined by the system as to be automated into automated activities;
during execution of the testing project, automatically performing by the system the automated activities.

2. A computer program product embodied on a non-transitory computer readable medium, comprising computer code for:
identifying in a design of a testing project, by a system, a plurality of manual activities, the plurality of manual activities including a plurality of tasks that are intended by a test project designer as to be performed manually;
automatically determining, by the system, which of the plurality of manual activities to automate, including for each of the manual activities:
  determining, by the system from historical data, a risk of an error occurring if the manual activity is performed manually without being automated,
  determining, by the system, a number of times the manual activity occurs within the testing project,
  determining, by the system, a location of the manual activity within the testing project with respect to a plurality of additional activities,
  inputting to an algorithm by the system the determined risk, the determined number of times, and the determined location within the testing project, and
  receiving as output from the algorithm by the system an indication of whether to automate the manual activity; and
using a repository of available automated activities, converting, by the system, the manual activities that are determined by the system as to be automated into automated activities;
during execution of the testing project, automatically performing by the system the automated activities.

3. A system comprising:
a memory system; and
one or more processing cores coupled to the memory system and that are each configured for:

identifying in a design of a testing project, by the system, a plurality of manual activities, the plurality of manual activities including a plurality of tasks that are intended by a test project designer as to be performed manually;

automatically determining, by the system, which of the plurality of manual activities to automate, including for each of the manual activities:

determining, by the system from historical data, a risk of an error occurring if the manual activity is performed manually without being automated, determining, by the system, a number of times the manual activity occurs within the testing project, determining, by the system, a location of the manual activity within the testing project with respect to a plurality of additional activities, inputting to an algorithm by the system the determined risk, the determined number of times, and the determined location within the testing project, and receiving as output from the algorithm by the system an indication of whether to automate the manual activity; and using a repository of available automated activities, converting, by the system, the manual activities that are determined by the system as to be automated into automated activities;

during execution of the testing project, automatically performing by the system the automated activities.

\* \* \* \* \*